(No Model.) 6 Sheets—Sheet 1.

W. P. SHORTRIDGE, Jr., & W. P. SHORTRIDGE.
GRAIN DRILL.

No. 279,027. Patented June 5, 1883.

Attest:
A. M. Long.
Chas. H. Baker

Wm. P. Shortridge.
Wm. P. Shortridge, Jr.
Inventors.
By H. F. Tunis,
Atty.

(No Model.) 6 Sheets—Sheet 3.
W. P. SHORTRIDGE, Jr., & W. P. SHORTRIDGE.
GRAIN DRILL.
No. 279,027. Patented June 5, 1883.

Attest:
A. M. Long.
Chas H Parker

Wm. P. Shortridge.
Wm. P. Shortridge, Jr.
Inventors.

By H. J. Ennis,
Atty.

(No Model.) 6 Sheets—Sheet 4.
W. P. SHORTRIDGE, Jr., & W. P. SHORTRIDGE.
GRAIN DRILL.
No. 279,027. Patented June 5, 1883.
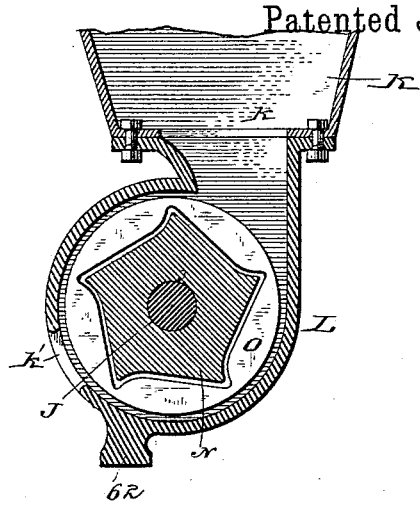
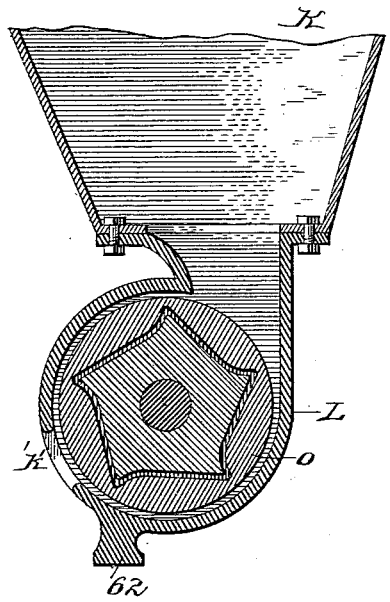
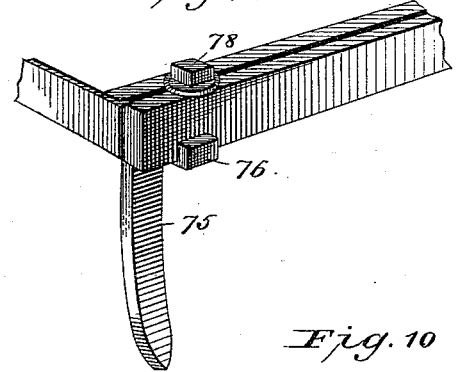
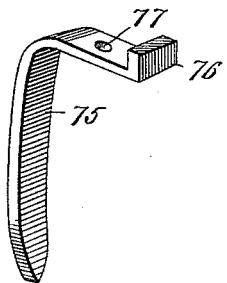
Attest:
A. M. Long,
Chas. H. Baker
Wm. P. Shortridge.
Wm. P. Shortridge, Jr.
Inventors.
By T. A. Ennis,
Atty.

(No Model.) 6 Sheets—Sheet 5.

W. P. SHORTRIDGE, Jr., & W. P. SHORTRIDGE.
GRAIN DRILL.

No. 279,027. Patented June 5, 1883.

Attest:
A. M. Long.
Chas. H. Baker.

Wm. P. Shortridge.
Wm. P. Shortridge, Jr.
Inventors.

By H. J. Ennis
Atty.

(No Model.) 6 Sheets—Sheet 6.
W. P. SHORTRIDGE, Jr., & W. P. SHORTRIDGE.
GRAIN DRILL.
No. 279,027. Patented June 5, 1883.
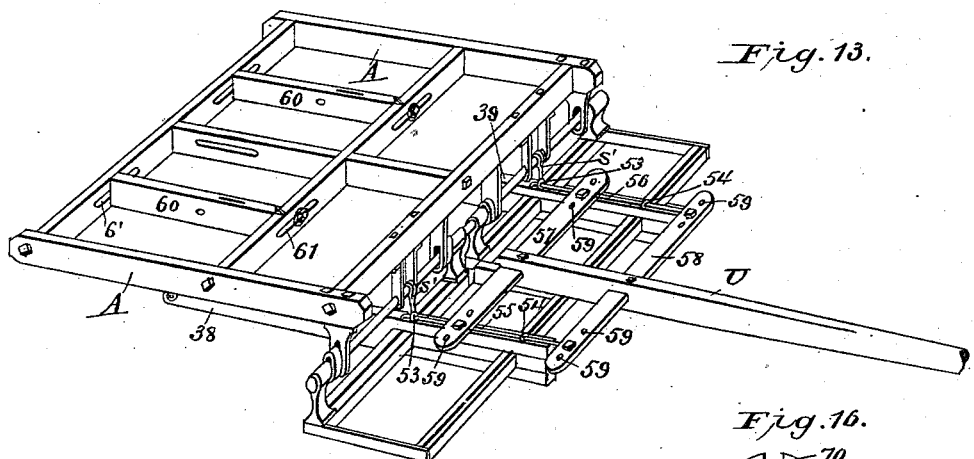
Fig. 13.
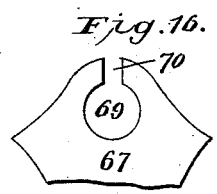
Fig. 16.
Fig. 14.
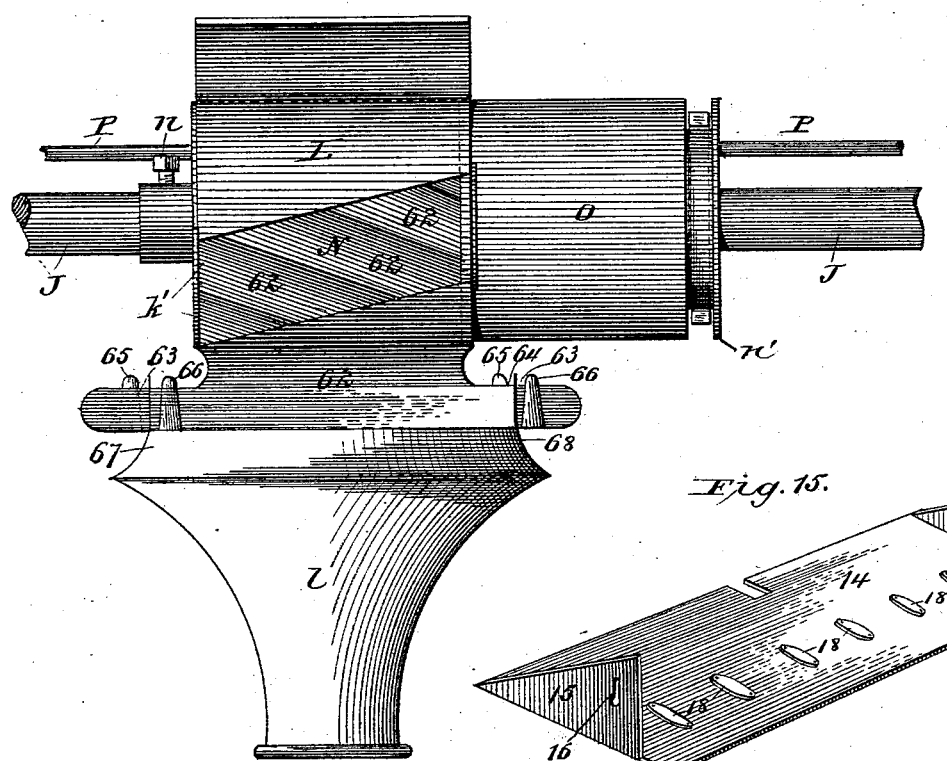
Fig. 15.
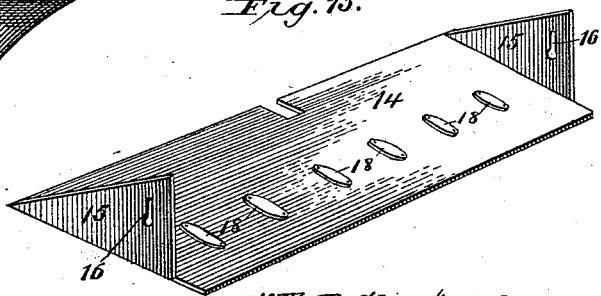
Wm. P. Shortridge.
Wm. P. Shortridge, Jr.
Inventors.
Attest:
A. M. Long.
Chas. H. Baker
By H. J. Ennis
Atty.
N. PETERS, Photo-Lithographer, Washington, D. C.

United States Patent Office.

WILLIAM P. SHORTRIDGE, JR., AND WILLIAM P. SHORTRIDGE, OF EASTON, MISSOURI.

GRAIN-DRILL.

SPECIFICATION forming part of Letters Patent No. 279,027, dated June 5, 1883.

Application filed April 27, 1883. (No model.)

*To all whom it may concern:*

Be it known that we, WILLIAM P. SHORTRIDGE, Jr., and WILLIAM P. SHORTRIDGE, citizens of the United States, residing at Easton, in the county of Buchanan and State of Missouri, have invented certain new and useful Improvements in Grain-Drills, of which the following is a specification, reference being had therein to the accompanying drawings.

Our invention has relation to grain-drills, and its object is to provide an implement of this class adapted to drill all kinds of grain, or sow the same broadcast when desired, and cover in the seed in one operation, to do effective service as a cultivator or harrow, and for rolling the grain or drill-rows in the spring of late-sown fall wheat; and to that end the novelty consists in the construction, combination, and arrangement of the same, as will be hereinafter more fully described, and particularly pointed out in the claims.

In the accompanying drawings similar letters of reference indicate like parts of the invention.

Figure 1:
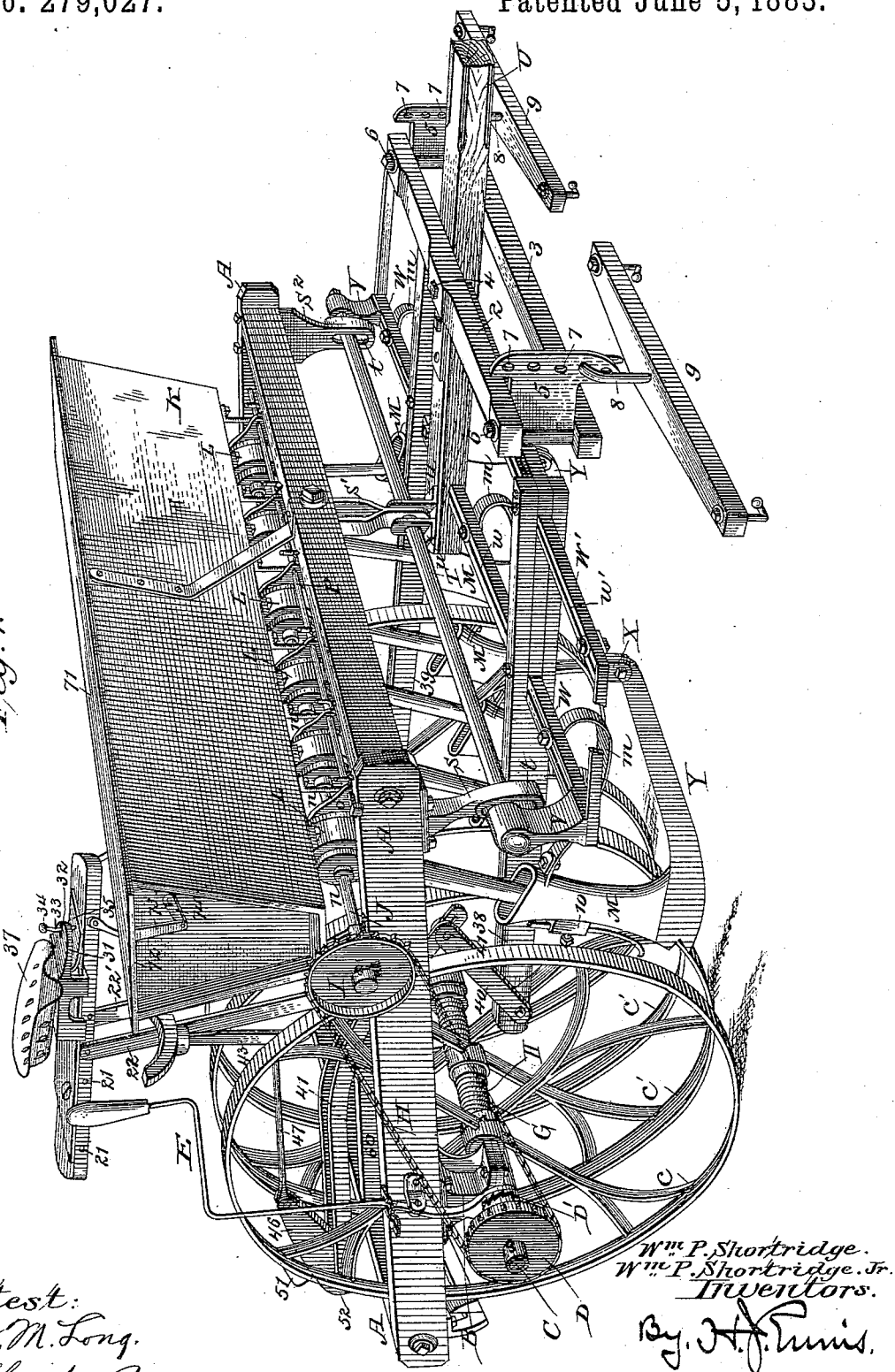
Figure 2:
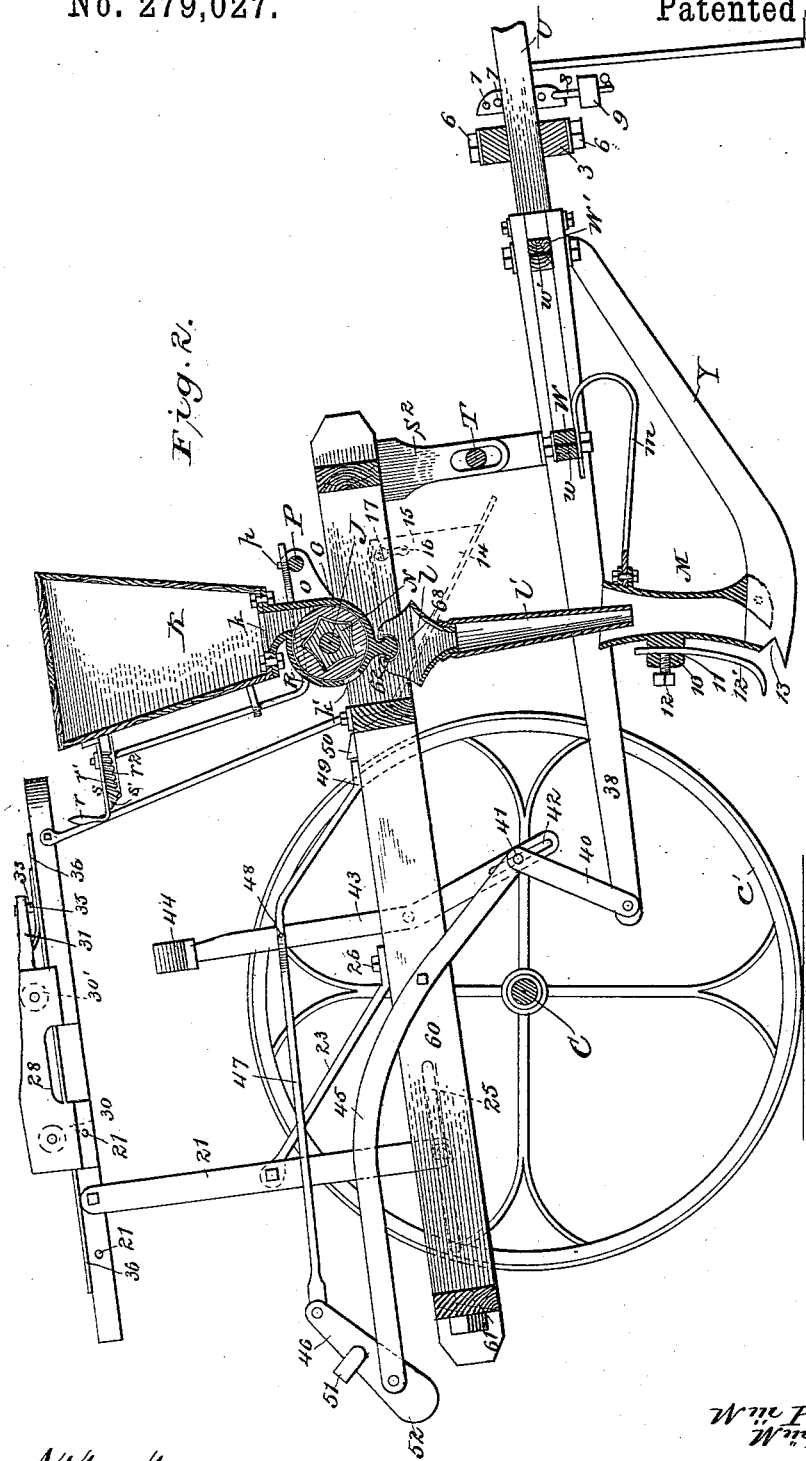
Figure 3:
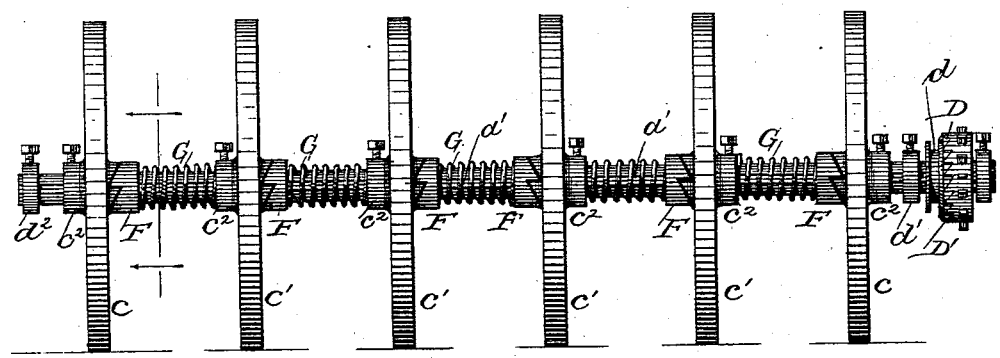
Figure 4:
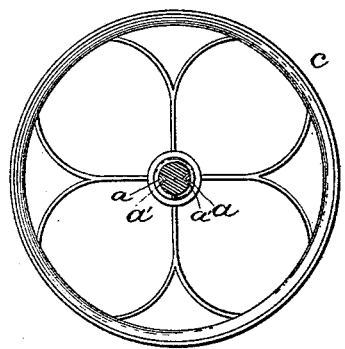
Figure 5:
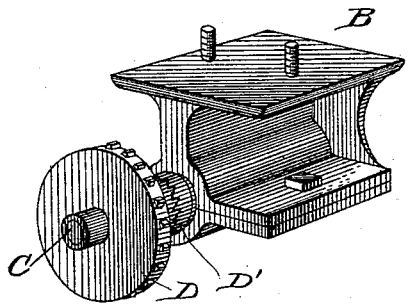
Figure 6:
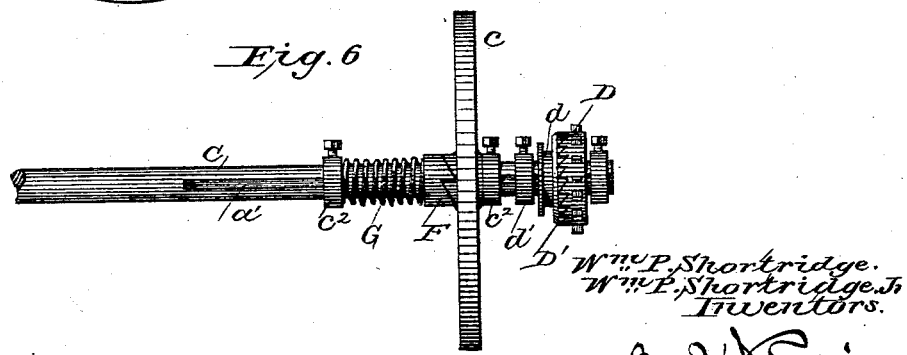
Figure 11:
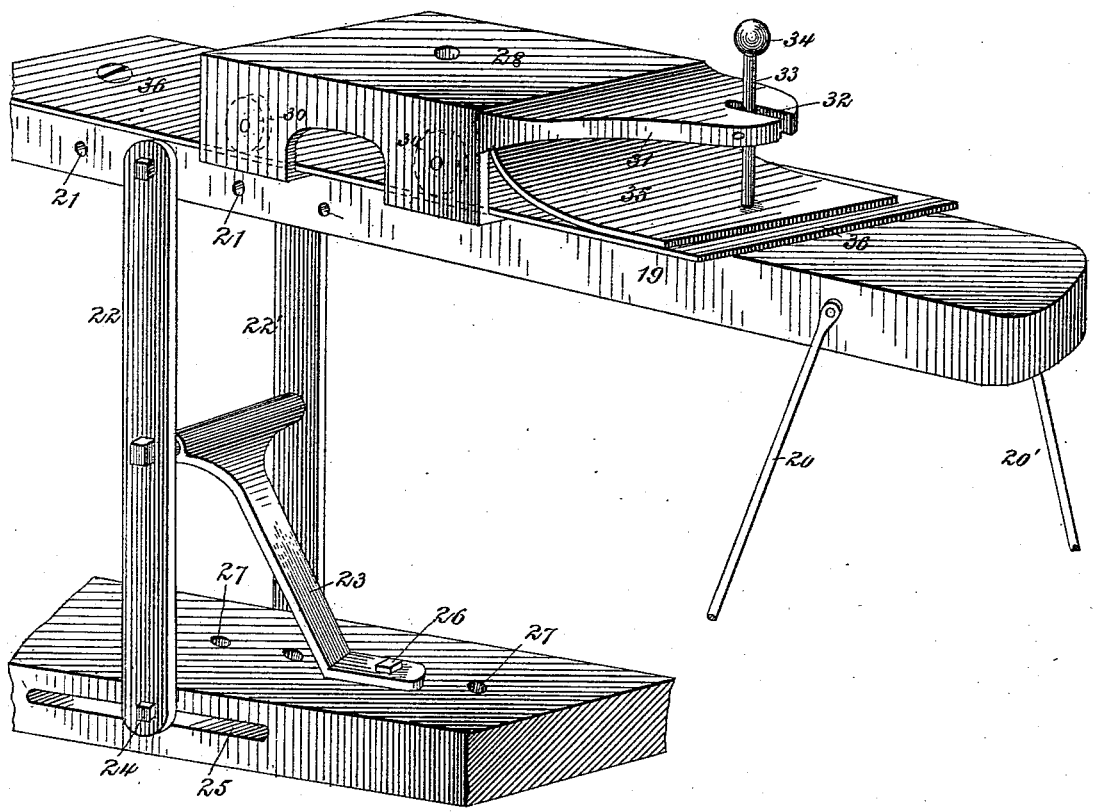
Figure 12:
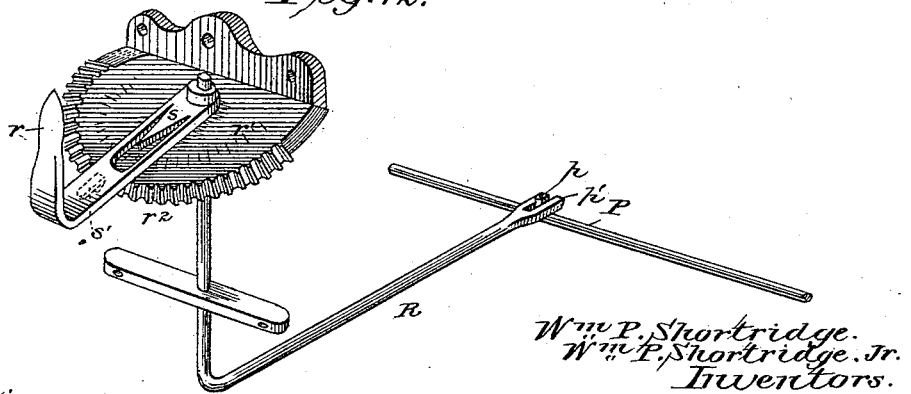

Figure 1 is a perspective elevation of our improved drill. Fig. 2 is a side elevation, partly in section. Fig. 3 is a rear view of the carrier and covering wheels and their connections and shaft detached from the machine. Fig. 4 is a side elevation of one of the covering-wheels, with the shaft shown in section. Fig. 5 is a detached perspective view of the main-shaft driving-gear and bracket; Fig. 6, a rear elevation of one of the carrier-wheels, shaft, clutch, and driving-gear. Figs. 7 and 8 are sectional views of the feeding mechanism. Fig. 9 is a portion of the forward frame, showing the harrow or cultivator tooth and its details; Fig. 10, a similar view of one of the teeth detached from the frame. Fig. 11 is a perspective elevation of the sliding seat and the arrangement of the parts of the same. Fig. 12 is a view of the gage-plate and operating mechanism for regulating the supply of seed. Fig. 13 is a view of the frame detached, showing the manner of mounting the cutter-frames in two sections. Fig. 14 is a detached view of the feeding mechanism; Fig. 15, a perspective view of the scattering pan or board detached from the machine, and Fig. 16 an elevation of one of the ears of the seed-funnel $l$.

A is a rectangular frame, and to the under part of the side pieces are secured brackets B B, one on each side piece. In these brackets is journaled a shaft, C, upon which is mounted a series of wheels, $c\ c\ c'\ c'\ c'\ c'$. Between the sides of the frame, and on one end of this shaft, is secured a sprocket-wheel, D. This wheel D is provided with a clutch, D', which is mounted on the shaft C by means of keys $a\ a$, sliding in the grooves $a'\ a'$, which allow it to have a lateral motion. When the wheels $c\ c'$ turn they carry the shaft C with them, and it in turn revolves the clutch D'. This of course operates the sprocket-wheel D.

E is a hand-lever fulcrumed in the frame A, its lower end being forked, so as to encircle the annular recess $d$ on the clutch D', and when the handle of the lever is pulled in toward the driver the clutch engages with the sprocket-wheel D, and the whole turns together. If, however, the handle of the lever is reversely operated, the clutch is detached from the wheel D, and of course it does not revolve.

$d'$ is a collar on the end of the shaft C for adjusting the lateral motion of the clutch D' and wheel D, and $d^2$ is a similar collar on the opposite end of the shaft to adjust it in the bracket on the frame. The wheels $c\ c'$ are each loosely mounted on the shaft, and each one is prevented from moving laterally by an adjustable collar, $c^2$.

F is a clutch which engages with the wheels, and is provided with keys $f$, which allow it to slide in the grooves $a'\ a'$.

G is a spiral spring, which, pressing between the rigid collar $c^2$ and the movable clutch F, keeps the latter in engagement with the wheel, and at the same time will allow the clutch to release from the wheel if the wheel were to be turned backward. The operation of this arrangement is such that when the machine is turning corners the pivot-wheel will turn very slowly, while the outside wheel will revolve more rapidly, and the intermediate wheels in proportion to their location. By means of these clutches they automatically adjust themselves to the required speed, and when the machine starts in the new line all the wheels revolve in unison.

The sprocket-wheel D is provided with driving-chain H, which communicates motion to a similar wheel, I, secured to the feed-shaft J, which is mounted in bearings on the sides of the frame, so as to revolve under the seed-box K.

L L are a series of feed cups or boxes located under the seed-box K, and communicating with it by the passage $k$. Each feed-box has a diagonal discharge-opening, $k'$, through which the grain falls into the funnel $l$, thence through the rubber tube $l'$ into the boot M, from which it is deposited in the drill-row. The feed-shaft J passes through the feed-boxes L, and to the shaft, in line with each feed-box, is sleeved the feed-wheel N, adjustably secured on said shaft by a set-screw, $n$.

O is a regulating-cylinder sliding freely on the shaft J, so as to laterally open and close the discharge-opening $k'$. These cylinders O are provided with collars $n'$, which receive an arm, $o$, secured to the shaft P, so that by operating the said shaft to the right or left the whole series of cylinders O are simultaneously moved to open or close the discharge-opening $k'$. This shaft P is provided with a pin, $p$, which engages the forked end $p'$ of the feed-regulating shaft R, the vertical end of which may terminate in a handle, $r$, journaled in the gage-plate $r'$, which has a series of detents, $r^2$. An indicator or pointer, $s$, and a pawl, $s'$, on the handle $r$ are arranged so that the handle may be operated to adjust the cylinders in the feed-boxes to discharge or sow any desired amount of grain. The shaft J, being rotated by the chain H, turns all of the feed-wheels N, with cylinders O, and they carry the seed around in the boxes L and raise it until it falls through the opening $k'$, and thence into the drill-furrow, as above set forth.

S S' S² are depending brackets secured to the forward end of the frame A, and through these brackets is mounted a shaft, T, it being journaled in the central bracket, S', while it plays in the vertical slots $t$ $t$ in the end brackets, S S².

To the central portion of the shaft T is secured the rear end of the tongue U by means of the angle-plates $u$, which apply the line of draft to the center of the frame A.

V V are arms on the outer ends of the shaft T, which carry the cutter-frame W W', which is also centrally secured to the tongue U. The rear portion of this frame W is provided with a longitudinal slot, $w$, in which is adjustably bolted the forward ends of the boot-springs $m$, and the forward portion of the same has a similar slot, $w'$, through which are adjustably bolted the knees X, which carry the cutters Y. By means of these slots $w$ and $w'$ the cutters and boots may be laterally adjusted to form drill-rows of any desired width.

2 and 3 are beams, one above and the other below the tongue, and pivotally secured thereto by a single bolt, 4, so as to form a double-tree, and between its outer ends is pivoted a clevis, 5, which is secured thereto by a bolt, 6. The forward end of this clevis has a series of holes, 7, by means of which the hook 8 on the single-tree 9 may be attached to it, whereby the depth of the cutters may be adjusted. If the hook 8 be placed in the highest hole in the clevis, the cutters are drawn to their greatest depth in the soil, and this draft is diminished as the single-tree is placed lower in the holes 7.

The boots M have a rear projection, 10, provided with a vertical slot, 11, and set-screw 12, by means of which the covering-springs 12' may be adjusted vertically, so as to cover the grain in the furrow, and it may be raised so as to clear the ground when the covering is done by the wheels $c'$.

The rear ends of the furrow openers or cutters Y are bifurcated a little forward of the boot, so as to open a space in the furrow for the seed to drop in, and the extreme ends of these cutters have a cut-away portion, 13, which allows a little of the soil to fall in the furrow from either side and form a bed for the grain, as otherwise it would drop in the angle of the furrow, which would crowd the grain and cause it to pile one grain on the other, whereas the portions 13, by allowing the soil to fall in and form a bed in the furrow, the grain spreads and comes up evenly.

14 represents a scattering-pan, (shown in dotted lines in Fig. 2,) and provided with side brackets, 15, having eyebolt-slots 16, by means of which it is fastened to the bolts 17 on the frame A. Of course when this scattering-pan is used for broadcast sowing the funnels and tubes are removed. The inclined face of this pan 14 has a series of oval bars, 18, situated under the opening $k'$ in the feed-box, so that the grain, as it falls from the box, strikes these bars and is scattered over the face of the pan, and in its course downward is evenly distributed upon the ground.

19 is the seat-rail, and its forward end is pivoted to braces 20 20', secured to the frame A, while the rear end has a series of bolt-holes, 21, through one of which the rail is pivoted to the lever-frame 22 22', fulcrumed on adjustable standard 23, and the lower bolt, 24, of the lever-frame passes through a horizontal slot, 25, in the cross-bar of the frame A. The standard 23 may be adjusted by means of the bolt 26 and the holes 27 in the frame A.

Upon the rail 19 is mounted a seat-carriage, 28, sliding upon rollers 30 30', and projecting from the front of the carriage is a bracket, 31, having a slot, 32, in which is pivoted a friction-pawl, 33. This pawl is provided with a handle, 34, and its lower end comes in contact with the friction-spring 35, so as to cause it to bind upon the plate 36, secured to the seat-rail. It will thus be seen that if the pawl 33 is released from the spring 35 the carriage is free to roll on the rail. It may be adjusted by pressing the spring 35 down by means of the pawl 33. The seat is held rigidly in its new position. The seat 37 is secured to the carriage 28 by a bolt. (Not shown.)

38 and 39 are rear extensions of the frame W W', and their rear ends are provided with a connecting-rod, 40, the opposite end of which is provided with a bolt, 41, which works in a slot, 42, in the lower end of the foot-lever 43. This lever 43 is fulcrumed in the frame A, and extends upward, terminating in a shoe, 44.

45 is a secondary lever pivoted to the frame, its lower end connected to the bolt 41, working in the slot 42 of the lever 43, and its longer end is connected to a foot-block, 46, while the other end of the foot-block is attached to a connecting-rod, 47, which is pivoted to the foot-lever 43 at 48, and its free end terminates in a toe, 49, which engages the check 50, secured to the frame. The foot-block 46 is provided with a rest, 51, to accommodate the instep of the foot.

In the position shown in Fig. 2 the cutter-frame is raised. To lower it the foot is placed on the block 46 and pressure applied. This withdraws the toe 49 from the check 50, and in this position the pressure of the foot is thrown forward on the block 46, so as to press that end of the rod 47 down. This raises the toe 49 to let it pass over the check 50, and the weight of the cutter-frame causes it to drop in the ground. While in this position the feet of the driver may be placed on the shoe 44 to press it forward and throw the cutters deeper into the soil; or by adjusting the pressure any desired depth may be given the cutters. To raise the frame and cutters clear of the ground, the seat is slipped back to enable the driver to place his foot upon the block 46 and apply pressure thereto. This raises the cutter-frame clear of the ground, and if the pressure is then transferred to the rear end, 52, of the block 46 this raises that end of the rod 47 and throws the toe 49 down, which causes it to engage with the check 50 and hold the frame in an elevated position.

The levers and mechanical movements just described for raising and lowering the cutter-frame are duplicated—that is to say, one system of levers is connected to the extension 38, and its duplicate system is attached to the other extension, 39, so that the whole frame may be raised and lowered evenly.

If necessary, the shaft T may be divided in the center to make two sections of it and the cutter-frame, so that each cutter-frame will act independent of the other. In this case the central bracket, S', is duplicated to place one in the center of each shaft, and the extension-bars 38 and 39 have eyebolts 53 and 54, through which the rods 55 and 56, secured to the cross-bars 57 and 58, pass. These bars are secured to the rear end of the tongue U, and are provided with holes 59 for adjusting the rods 55 and 56. It will thus be seen that the draft of the tongue is applied to the center of the double cutter-frames, and they may readily be adjusted to drill uneven ground. That portion 60 of the frame A to which the levers 43 and 45 are pivoted is adjustable by means of the slots 61 to make them conform to the central draft-line of the cutter-frame.

The feed-wheel N is cylindrical in form, and its periphery is provided with a series of longitudinal parallel flutes, 62, arranged at an angle to the shaft J, and the discharge-opening $k'$ is inclined reversely to the flutes 62. This construction allows a regular and uniform discharge of the grain, for when the grain in one flute is about a third discharged the second flute begins to discharge, and by the time the first flute has discharged two-thirds of its contents the second flute has discharged one-third and the third flute is just beginning, and so on continually, three of the flutes always discharging regularly. This enables the feed-wheel to do its work effectively while being run at a very slow rate of speed. As before mentioned, the regulating-cylinder O may be operated by the handle $r$, so as to open or close the passage $k$ to admit more or less grain to the feed-box L to supply the feed-wheel N; and the effect of this cylinder is to simply lengthen or shorten the wheel N, which of course does not affect the manner of its feeding. Consequently the regularity of its feed is preserved, whether it be nearly closed or open to its full extent.

The bottom of the feed-box L has cast thereon a bracket, 62, provided with recesses 63 and 64 and studs 65 and 66, and the funnel $l$ has ears 67 and 68 cast on its ends. These ears have holes 69 and slots 70, so that by pressing the funnel up the slots 70 pass the recesses 63 and 64 to allow the studs 65 and 66 to clear brackets, and is then moved to the right or left, when it will remain suspended on the bracket 62, and it will adjust itself to conform to the position of the tube in the boot.

The cover 71 of the seed-box K is provided at its ends with metal plates 72, which prevent the cover warping, and these plates are provided with rigid metal arms 73, which are attached to a crank, 74, pivoted to the end of the box to form a hinge. To operate this device the cover is raised a short distance and then allowed to fall forward by gravity, the arms resting on the front of the box, holding it in this position. This arrangement dispenses with the common form of hinge and greatly lessens the liability to derangement.

When the machine is to be used as a cultivator or harrow the cutters Y may be raised so as to clear the ground, or they may be removed altogether and the teeth 75 inserted or bolted in the slots $w$ and $w'$. These teeth are held in place by the shoulder 76 and bolt 78, passing through the hole 77, and of course they may be adjusted in the said slots in the frame, being alternately arranged on either part. By alternately arranging the brackets X longitudinally the cutters Y may be double banked or set "zigzag"—that is, the knives or cutters are set one ahead of the other, which facilitates their clearing in trashy ground.

Having thus fully described our invention, what we claim as new and useful, and desire to secure by Letters Patent of the United States, is—

1. The cutter-frame W W', mounted in standard S S' S², secured to the main frame A, whereby the cutter-frame is adjustable independent of the main frame, as set forth.

2. The combination, with the cutter-frame, of the curved springs $m$, secured directly to the boots M, as set forth.

3. The frame A, having standards S S' S², having slots $t$, in combination with the cutter-frame provided with brackets V, as set forth.

4. The cutter-frame W W', having slots $w$ $w'$, in combination with the cutters X Y M and curved spring $m$, as set forth.

5. The cutter-frame W W', having extensions 38 and 39, provided with connecting-rods 40 41, in combination with the main frame A, having levers 43 and 45, as set forth.

6. The combination, with the boots M, springs $m$, and cutter-frame W W', of the cutter Y, having cut-away portion 13, as and for the purpose set forth.

7. The boot M, having lug 10, slot 11, set-screw 12, and spring-covers 12', in combination with cutter Y and spring $m$, as and for the purpose set forth.

8. The cutter-frame W W', having slots $w$ $w'$, in combination with the boots M, springs $m$, cutter Y, and adjustable brackets X, as set forth.

9. The tongue U and double-tree 2 3, pivotally secured thereto by the bolt 4, in combination with the clevis 5, having a series of holes, 7, and secured to the double-tree by bolts 6, as and for the purpose set forth.

10. The cutter-frame W W', tongue U, having angle-plates $u$ $u$, and standards V V, in combination with the main frame A, having brackets S S' S², as and for the purpose set forth.

11. The cutter-frame having extensions 38 and 39, provided with connecting-rod 40, in combination with the main frame A, having adjustable cross-bars 60, to which are mounted the levers 43 and 45, having connecting-rod 47 and block 46, provided with the rear extension, 52, as and for the purpose set forth.

12. The combination, with the cutter-frame, of the lever 43, having slot 42, the lever 45, block 46, and connecting-rod 47, having toe 49, and the check 50, as set forth.

13. In a grain-drill, the main driving-shaft C, having loosely-mounted wheels $c$, adjustable collars $c^2$, clutch F, and spring G, as and for the purpose set forth.

14. In a grain-drill, the shaft C, having grooves $a'$, clutch F, and key $a$, in combination with the wheels $c$ $c'$, springs G, and collars $c^2$, as and for the purpose set forth.

15. The shaft C, having grooves $a'$, collar $d'$, and clutch D', having annular recess $d$, in combination with the sprocket-wheel D and hand-lever E, as and for the purpose set forth.

16. The frame A, having slot 25, holes 27, and braces 20 20', in combination with the standard 23, frame 22 22', and seat-rail 19, having plate 36, and seat-carriage 28, provided with rollers 30 30', extension 31, lever 33, and friction-spring 35, as and for the purpose set forth.

17. The combination, with the driving-shaft C, chain H, and sprocket-wheels D I, of the feed-shaft J, having feed-wheel N, and the feed-box L, provided with inclined opening $k'$, bracket 62, and adjustable funnel $l$, as set forth.

18. The seed-box K, having opening $k$, and feed-box L, provided with diagonal outlet $k'$, in combination with the shaft J, feed-wheel $n$, and regulating-cylinder O, as and for the purpose set forth.

19. The shaft J, having adjustable feed-wheel N $n$, provided with inclined flutes 62, in combination with the shaft P, arms $o$, and cylinder O, and the regulating-lever R $r$, and gage-plate $r'$ $r^2$, as and for the purpose set forth.

20. In a grain-drill, the feed-box L, having bracket 62, provided with studs 66 and slots 63, in combination with funnel $l$, having ears 67, slots 70, and holes 69, as and for the purpose set forth.

21. In a grain-drill, the seed-box K, having cover 71, and plates 72, provided with arms 73 and crank 74, as and for the purpose set forth.

In testimony whereof we affix our signatures in presence of two witnesses.

WILLIAM P. SHORTRIDGE, Jr.
WILLIAM P. SHORTRIDGE.

Witnesses to W. P. S., Jr.:
  H. J. Ennis,
  E. H. Bradford.

Witnesses to W. P. S.:
  E. Dan McCrary,
  C. L. Colt.